(12) United States Patent
Yamakado

(10) Patent No.: US 6,806,869 B2
(45) Date of Patent: Oct. 19, 2004

(54) DATA PROCESSING SYSTEM UTILIZING DISCRETE OPERATING DEVICE

(75) Inventor: Hitoshi Yamakado, Yokohama (JP)

(73) Assignee: Seiko Epson Corporation, Tokyo (JP)

( * ) Notice: Subject to any disclaimer, the term of this patent is extended or adjusted under 35 U.S.C. 154(b) by 328 days.

(21) Appl. No.: 10/061,196

(22) Filed: Feb. 4, 2002

(65) Prior Publication Data

US 2002/0122064 A1 Sep. 5, 2002

(30) Foreign Application Priority Data

Mar. 2, 2001 (JP) ........................................ 2001-059041

(51) Int. Cl.[7] .............................................. G09G 5/00
(52) U.S. Cl. ..................... 345/179; 178/18.02
(58) Field of Search ................ 345/173, 179; 340/825.34, 825.31; 455/422, 556; 713/183, 200, 202; 235/382, 382.5; 178/18.01, 18.02; 380/45; 710/8

(56) References Cited

U.S. PATENT DOCUMENTS

| | | | | |
|---|---|---|---|---|
| 5,376,945 A | * | 12/1994 | Takenaka et al. | ........... 345/810 |
| 5,457,738 A | * | 10/1995 | Sylvan | ..................... 379/93.23 |
| 5,821,871 A | * | 10/1998 | Benzler | ...................... 340/5.8 |
| 6,002,387 A | * | 12/1999 | Ronkka et al. | ............. 345/157 |
| 6,058,304 A | * | 5/2000 | Callaghan et al. | ....... 455/422.1 |
| 6,367,015 B1 | * | 4/2002 | Kubo et al. | .................. 713/183 |

FOREIGN PATENT DOCUMENTS

| | | |
|---|---|---|
| EP | 0 365 918 A2 | 5/1990 |
| WO | WO 92/21082 | 11/1992 |

\* cited by examiner

*Primary Examiner*—Amare Mengistu
*Assistant Examiner*—Nitin Patel
(74) *Attorney, Agent, or Firm*—Oliff & Berridge, PLC (57) ABSTRACT

Interface screen 30 is displayed on display 3 of data processing system 1; interface screen 30 is a composite screen of an interface screen of open Layer L1 on which data processing operations are available for general use, and an interface screen of closed layer L2 to which access is restricted to designated users. Identification data ID transmitted from pen-form operating device 2 is received in receiving part 15 of data processing system 1. When a position is selected by contacting an area on touch panel 3b with an operating device, the contacted position is detected by touch panel 3b. CPU 10 determines whether identification data ID stored in ROM 12 is received. CPU 10, on the basis of this determination result, selects both or either of layers L1 and/or L2. When a position is detected by touch panel 3b, CPU 10 executes a data processing operation corresponding to a detected position on selected layer(s). Accordingly, it is possible to easily and effectively restrict, on a user basis, access to operations within a restricted data layer.

16 Claims, 8 Drawing Sheets

DATA PROCESSING SYSTEM UTILIZING DISCRETE OPERATING DEVICE

TECHNICAL FIELD OF THE INVENTION

The present invention relates to a data processing system, and more particularly to a data processing system in which access to designated data operations is restricted to designated users.

RELATED ART

In conventional data processing systems such as personal computers or work stations, access to features and functions such as content display and data processing can be restricted so as to be available to authorized users only.

To gain access to restricted features and functions, or in some cases to gain any access to a data processing system in general, a user inputs a password, user name or similar code for verification by the system. Although a password, user name and like authorization methods of the conventional art are widely used, they are subject to a variety of problems. Firstly, if a user forgets or loses their access code, it is necessary to reset the system to gain access. This is a time-consuming operation, and also carries a risk of data loss. A further problem with the conventional art is that each time a system is started, it is necessary for a user to input their authorization code. Obviously, the need to manually and repetitively input such information into a system is both time-consuming and inefficient.

SUMMARY OF THE INVENTION

The present invention has been made to overcome the problems inherent in the conventional art as described above, and has as its object the provision of a data processing system in which operation access restriction can be effected both easily and rapidly.

To this end, the present invention comprises: a control method and a program to execute the same. The invention also comprises: a display means for displaying an interface screen in which images such as data operation icons are displayed, with each image corresponding to a data operation executable within one of a plurality of data layers, selection of one of which enabling a user to carry out a predetermined data operation; a discrete operating means for selecting a position designated by a particular data operation icon on the interface screen, and for transmitting identification data; a position detecting means for detecting a position selected by using an operating means; a storage means for storing identification data; a receiving means for receiving identification data; a determining means for determining whether identification data stored in the storage means is received by the receiving means; a data layer selecting means for selecting, on the basis of a result output from the determining means, one or more of the plurality of data layers; and a data processing means for executing processing in a data layer selected by the data layer selecting means, the data layer being designated by a position detected by the position detecting means.

The present invention further provides a method for controlling a data processing system comprising the steps of: displaying on a display means an interface screen on which images such as data operation icons are displayed, with each image corresponding to a data operation executable within one of a plurality of data layers; detecting on the interface screen by use of a position detecting means a position which is selected by using an operating device; receiving identification data in a receiving means; determining whether or not identification data stored in the storage means has been received by the receiving means; selecting, on the basis of a result of the determining step, one or more of the plurality of data layers; and executing processing with respect to a data layer selected in the data layer selecting step, the layer being selected on the basis of a position detected by the position detecting means.

In the present invention, the control method for a data processing system is not limited to being carried out directly within the system itself, but can also be implemented over a telecommunication circuit or be distributed in the form of a program stored on any computer-readable media, such as a CD-ROM, diskette, optical disc, and so on.

Figure 1:
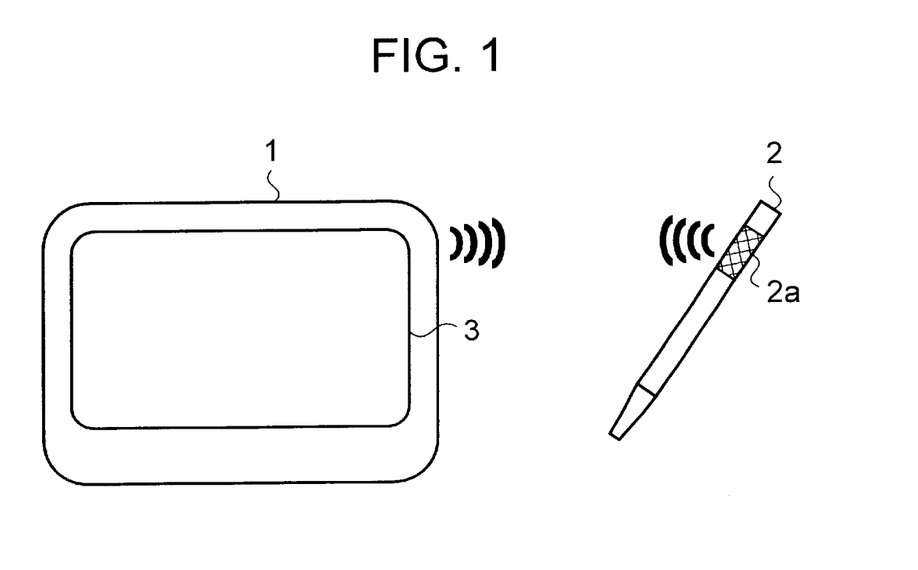
FIG. 1 shows a data processing system and a pen-form operating device in accordance with one embodiment of the present invention.
Figure 2:
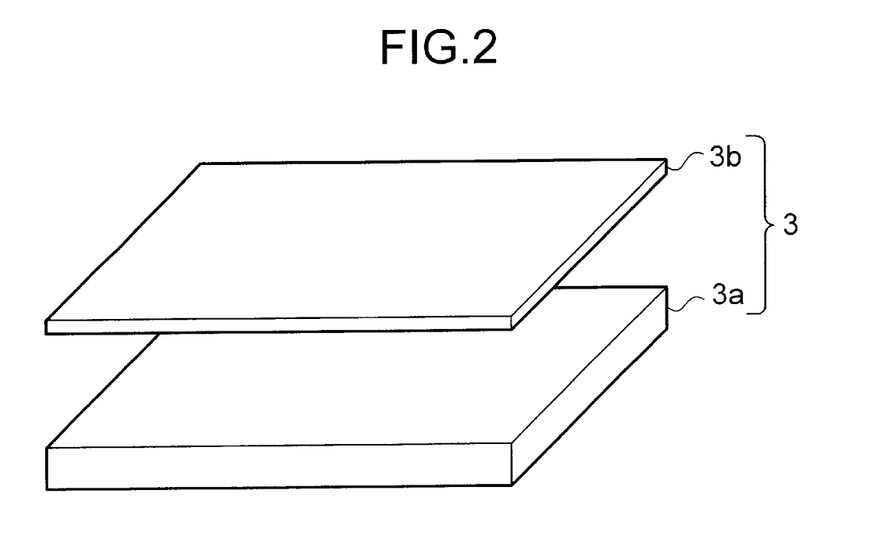
FIG. 2 shows the configuration of a display screen of the data processing system.

DETAILED DESCRIPTION OF THE INVENTION (1) Preferred Embodiment
(1.1) Configuration of the Embodiment FIG. 1 shows a data processing system 1 and a pen-form operating device 2 used for operating data processing system 1 in accordance with one embodiment of the present invention. Pen-form operating device 2 is a pointing device, and is held in an operator's hand. Data processing system 1 is a mobile system for use at work or at home, and is operated by using pen-form operating device 2. The body of data processing system 1 is slim and generally rectangular in appearance. Over the general area of its upper surface a display 3 is provided. As shown in FIG. 2, display 3 comprises a liquid crystal display panel 3a which has a transparent touch panel 3b (position detecting means) provided on its upper face. When a user contacts transparent touch panel 3b with operating device 2, the position contacted is detected.

Figure 3:
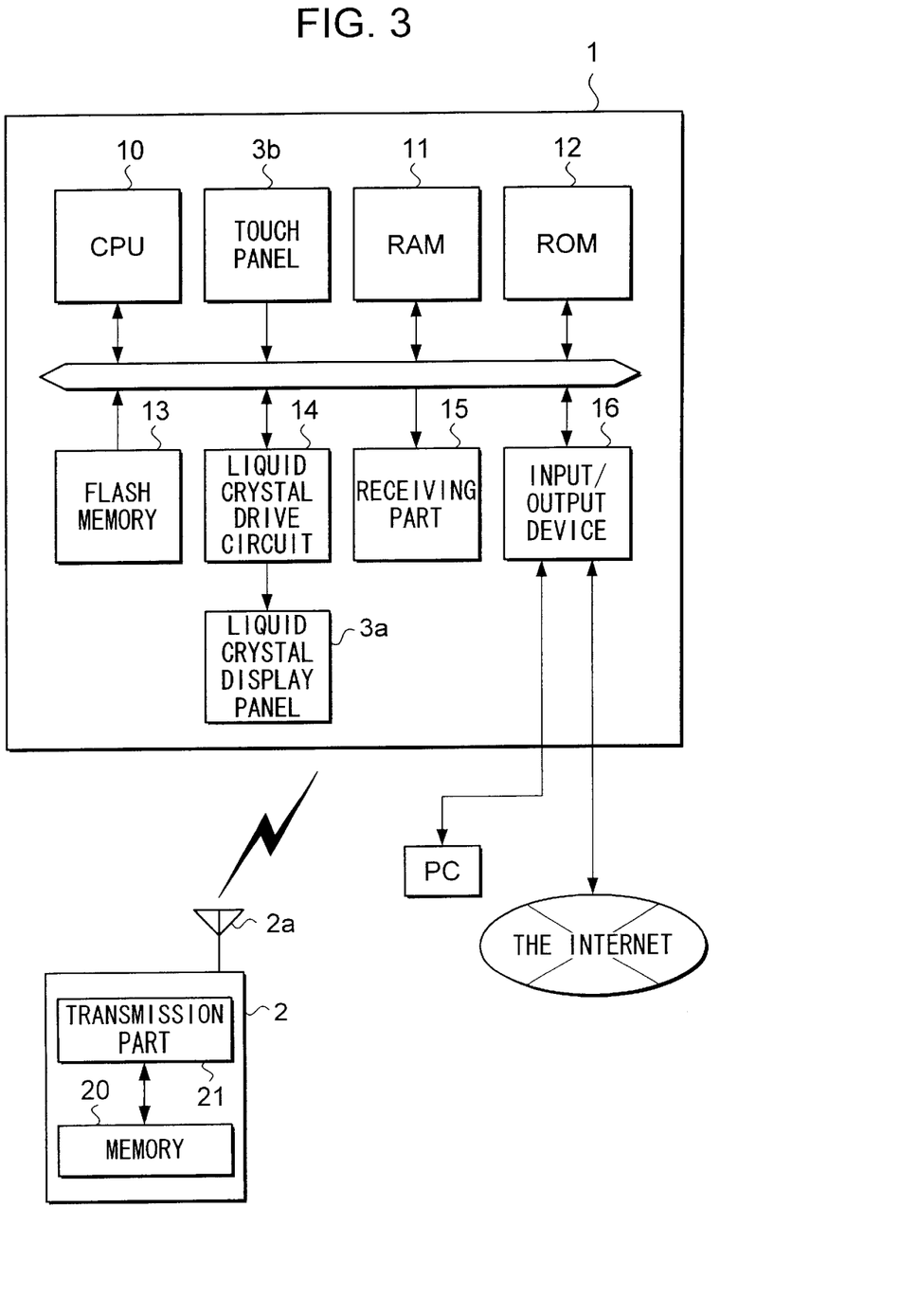
FIG. 3 is a block diagram showing the electrical configuration of the data processing system and the pen-form operating device.

To realize the stated object of the present invention, which is to readily and easily restrict access to designated operations of the processing system to designated users, data processing operations of the system are categorized into those available for general use, and available in an open layer L1; and those to which access is restricted to designated users, and which are only available in a closed layer L2. FIG. 3 shows an electrical configuration of data processing system 1 and pen-form operating device 2.

A memory 20 of pen-form operating device 2 is used to memorize user identification data ID. Pen-type operating device 2 is also provided with a battery, not shown. A transmission part 21 is supplied with power by the battery, to transmit identification data ID stored in memory 20 via an antenna 2a (see FIG. 1). As a battery for use in pen-form operating device 2, a rechargeable battery may be employed. Further, a battery recharging circuit may be provided in data processing system 1.

Transmission part 21 in pen-form operating device 2 transmits identification data ID to data processing system 1 by short range wireless communication. Thus, when pen-form operating device 2 is brought within close range of data processing system 1, the system is able to receive user identification data ID stored in the device. The term "close range" refers to a distance of, for example, up to several meters between data processing system 1 and operating device 2. Such short-range wireless communication may include, for example, electromagnetic or microwave induction types, or spread spectrum, such as direct sequence, or frequency hopping modulation types.

A receiving part 15 in data processing system 1 receives data via an antenna. Data processing system 1 is also provided with an input/output device 16, which, under control of CPU 10, is used to connect data processing system 1 to the Internet, or to a personal computer (PC) or the like to perform data communication. A ROM 12 (a storage means) is provided in data processing system 1 for storing programs and user identification data ID of operating element 2. In the present embodiment, only one data processing system is referred to, but there may be provided in conjunction other such systems. Each system has a pair of data processing devices 1 and pen-form operating devices 2; unique user identification data ID is stored in each of the devices. A RAM 11, also under control of CPU 10, functions as a buffer memory in which image data and the like is temporarily stored for display in liquid crystal display panel 3a; other data may also be stored in RAM 11. A flash memory (saving means) 13 is incorporated in data processing system 1 as a rewritable, nonvolatile memory.

Data for use in a user interface is stored in flash memory 13. In the present embodiment, the user interface is displayed in liquid crystal display panel 3a, which includes touch panel 3b. More specifically, CPU 10 displays in liquid crystal panel 3a an interface screen via which a user inputs an instruction by contacting an area on touch panel 3b with pen-form operating device 2.

In the present embodiment, the interface screen includes images of a plurality of operating icons that represent various processing operations available to a user. As described previously, these operations are allocated to either open layer L1 or closed layer L2. Layout data and other interface screen data is stored in flash memory 13.

Layout data may include image definitions for defining a size, shape, and so on of icon images that are selected to initiate different operations; also included is position data for specifying icon image positions. This layout data is classified as corresponding to open layer L1 or closed layer L2. Layout data within open layer L1 includes image definition and position data, and is available to all users; while that within closed layer L2 is available to designated users only. Additional data is that which specifies an operation to be executed in response to contacting with pen-form operating device 2 an area on touch panel 3b corresponding to a particular operation icon. Additional data for each operation icon is stored in flash memory 13, and is related via its respective assigned operation icon to corresponding layout data.

Upon providing power to data processing system 1 by using an ON/OFF switch, CPU 10 is activated as a determining means, a data layer selecting means, an data processing means, and a saving means; and controls all other data operations of data processing system 1 by reading out and executing a program stored in ROM 12.

As will be apparent from the foregoing description, CPU 10 functions to control attributes of a user interface screen. Illustratively, in the present embodiment, CPU 10 processes (maps) in an image storage area of RAM 11, and in accordance with layout data stored in flash memory 13, image data (bit map data) of a group of operation icons associated with open layer L1. Further, CPU 10 processes (maps) in an image storage area of RAM 11, and in accordance with layout data stored in flash memory 13, image data (bit map data) of a group of operation icons associated with closed layer L2. Upon processing by CPU 10, interface screen image data recorded in RAM 11 is displayed under operation of liquid crystal drive circuit 14 on liquid crystal display panel 3a.

To effect a data operation, a user selects with pen-form operating device 2 an operation icon visible in an area of touch panel 3b, CPU 10 determines which operation icon has been selected and executes a predetermined processing operation accordingly.

More specifically, when a data operation icon is selected in an area of touch panel 3b, and identification data ID matching that memorized in ROM 12 is at the same time being transmitted from pen-form operating device 2 to data processing system 1, CPU 10 will read from flash memory 13 data corresponding to the selected operation icon and execute designated processing. This processing is effected irrespective of whether the icon selected is associated with open layer L1 or closed layer L2. Conversely, if identification data ID is not being transmitted by pen-form operating device 2, and if an area of touch panel 3b is selected which is associated with closed layer L2, CPU 10 will not respond, and the requisite data operation will not be executed.

(1.2) Operation of Embodiment

Figure 7:
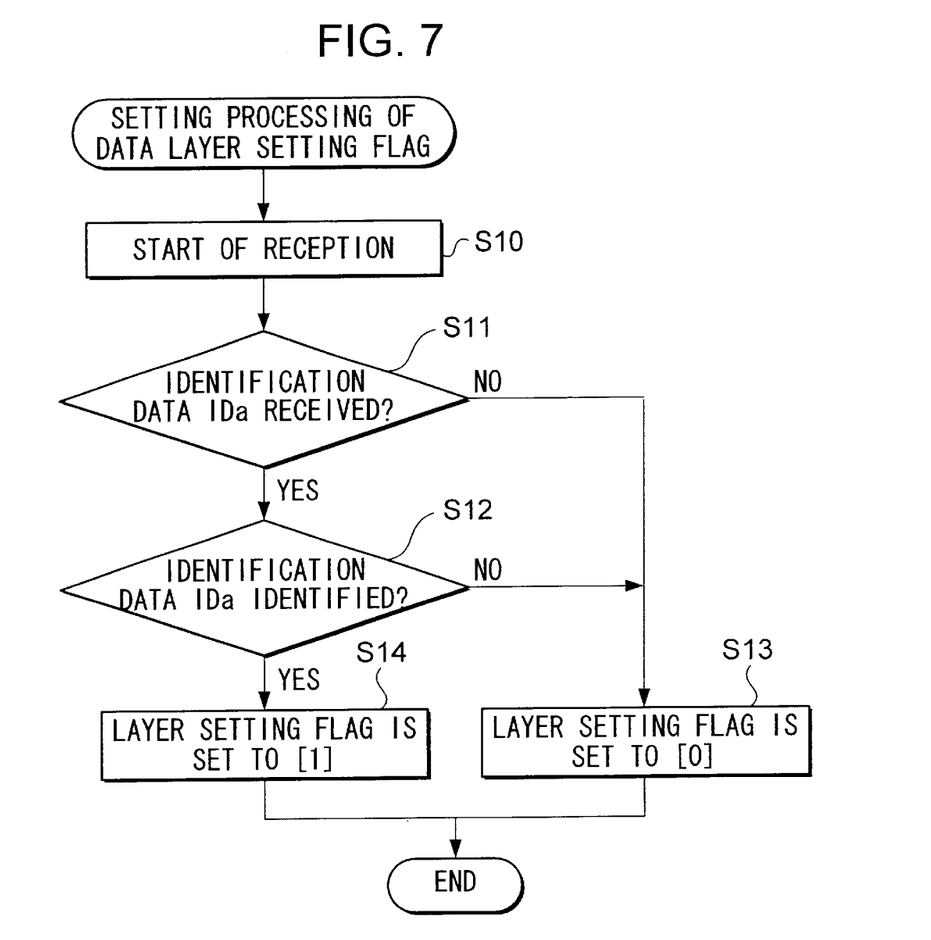
FIG. 7 is a flowchart illustrating a procedure for setting a layer flag of the data processing system.

When power is supplied to data processing system 1, CPU 10 executes a main routine memorized in ROM 12. CPU 10 is subject to an interrupt pulse at evenly timed intervals. Each time an interrupt pulse is applied to CPU 10, any currently active processing is intermitted and handled as an interrupt, whereby a data layer setting flag processing operation is stored in ROM 12. FIG. 7 illustrates a data layer setting flag processing routine.

First, the interrupt routine handled by CPU 10 will be explained. When initiating execution of an interrupt routine under an interrupt pulse, CPU 10 instructs start of reception in a receiving part 15 (step S10). Next, CPU 10 determines, based on a reception result in receiving part 15, whether identification data ID (hereafter referred to as "identification data IDa") is received (step S11). If a determination result of step S11 is "YES", CPU 10 determines whether or not the received identification data IDa matches identification data ID stored in ROM 12 (step S12). If a determination result of step S12 is "YES", CPU 10 sets in a predetermined area of RAM 11 "1" as a data layer setting flag F (step S14) and completes the routine.

On the other hand, if a determination result of step S11 is "NO" or a determination result of step S12 is "NO", CPU 10 sets in a predetermined area of RAM 11 "0" as a data layer setting flag F (step S13) and completes the routine.

Each time an interrupt pulse is applied, CPU 10 executes the above processing. Accordingly, while receiving identification data IDa matching identification data ID stored in ROM 12, CPU 10 maintains a data layer setting flag F as "1", by repeating a processing of steps S11, S12 and S14; whereas if the identification data IDa is not received, CPU 10 maintains a data layer setting flag F as "0" by repeating data processing of steps S11, (S12) and S13.

Next, a main routine of data processing system 1 will be explained with reference to FIG. 4.

When initiating a main routine, CPU 10 first performs an initialization processing (step S1). In step S1, as shown in FIG. 4, CPU 10 sets data layer setting flag F to "0" in a predetermined area of RAM 11. Next, CPU 10 performs display processing for interface screen 30 (step S2). In executing display processing, CPU 10 processes in an image storage area of RAM 11, and in accordance with layout data of open layer L1 and closed layer L2, mapping of image data (bit map data) of groups of operation icons. As a result, interface screen 30, as shown in FIG. 5, is displayed by liquid crystal drive circuit 14 in liquid crystal panel 3*a*. An interface screen 30 displayed on liquid crystal display panel 3*a* comprises a composite screen of an interface screen of open layer L1 and an interface screen of closed layer L2. Assigned a group of operation icons B1 correspond to open layer L1 and a group of operation icons B2 correspond to closed layer L2.

When step S2 is complete, CPU 10 determines whether a selection operation via touch panel 3*b* is performed (step S3). If a determination result of this step is "NO", CPU 10 repeats the same step. In the case that touch panel 3*b* is contacted, a determination result of step S3 becomes "YES" and processing in CPU 10 moves to step S4. In this step S4, CPU 10 determines whether a data layer setting flag F stored in RAM 11 is "1" or "0".

As already explained, a processing routine of a data layer setting flag is carried out repeatedly as interrupt processing against the main routine. Determination in step S4 of whether a data layer setting flag F is "1"or "0" depends on an execution result of a data layer setting processing routine executed immediately prior to the determination.

If it is determined in step S4 that a data layer setting flag F is "0", CPU 10 determines to which position on interface screen 30, and related to open layer L1, the selected position indicated by touch panel 3*b* corresponds, and executes a processing operation in accordance with the determination result (step S5).

Figure 5:
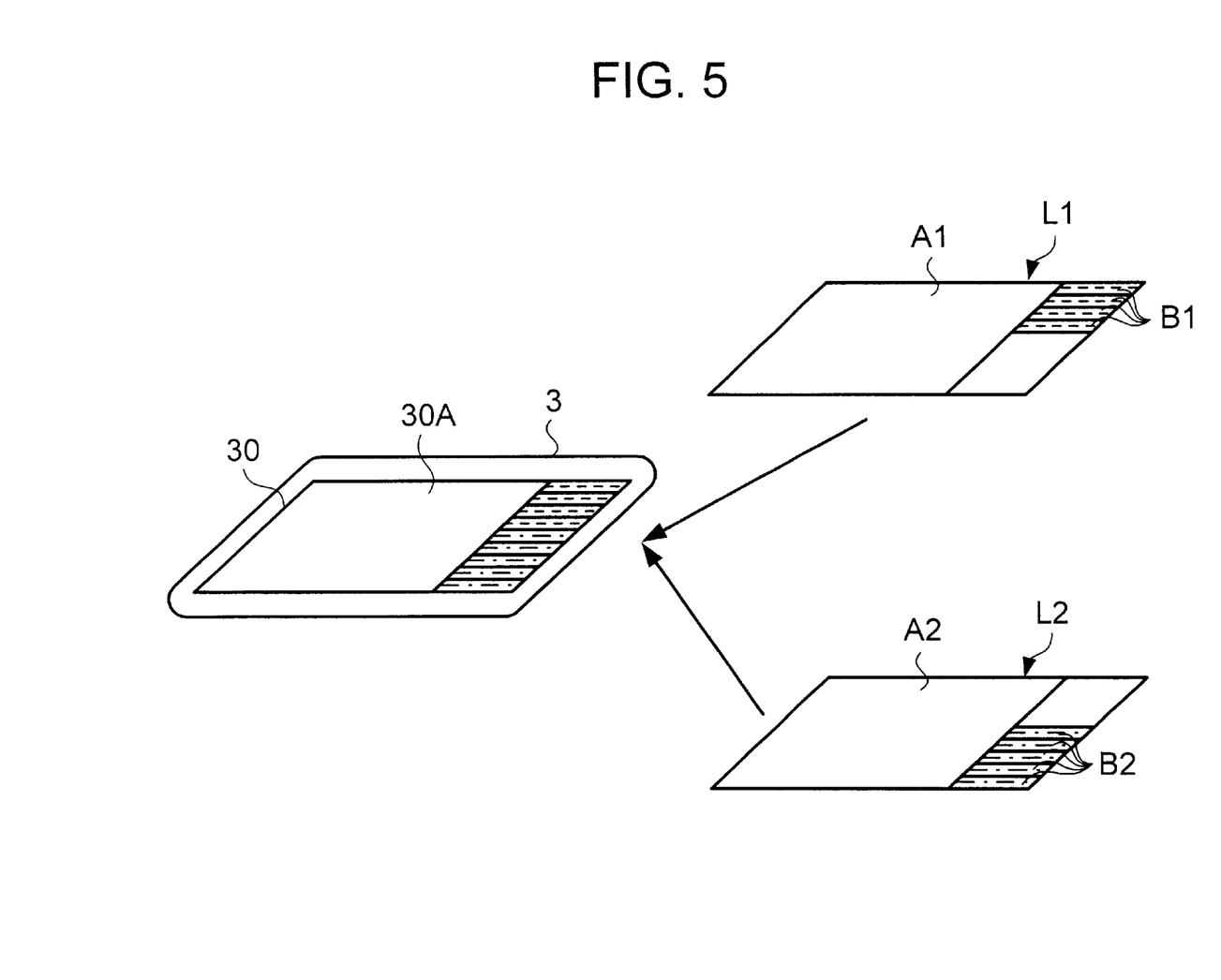
FIG. 5 shows a logical configuration of an interface screen of the data processing system.
Figure 6:
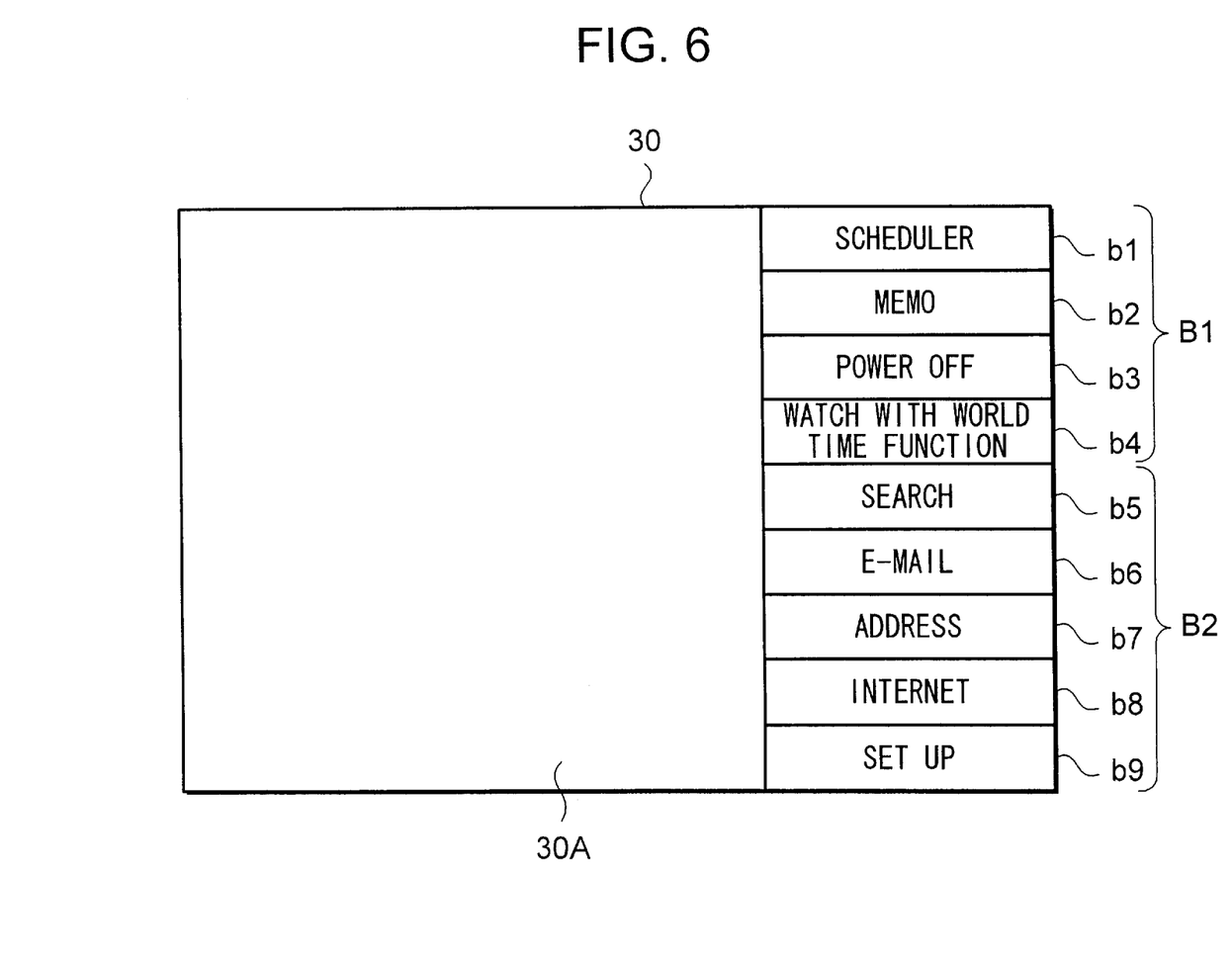
FIG. 6 shows an example of a data operation image displayed by a data processing system.

More specifically, if "scheduler" icon b1 (see FIG. 6) is selected, CPU 10 inverts image data of "scheduler" icon b1 in an image storage area of RAM 11. As a consequence, "scheduler" icon b1 is displayed in inverse video on the interface screen 30 displayed in liquid crystal panel 3*a*. CPU 10 also reads from flash memory 13 the additional data corresponding to "scheduler" icon b1. Such additional data includes information designating an application program for "scheduler". CPU 10 executes the application program designated by the additional data. In the execution process, CPU 10 reads from flash memory 13 schedule information of a user and produces a schedule image and writes the image into an area corresponding to work area 30A within the image storage area of RAM 11, as shown in FIG. 5. As a result, a schedule image is displayed in work area 30A of liquid crystal display panel 3*a*. Also, when executing the application program in response to selecting an operation icon, CPU 10 writes in a predetermined storage area of RAM 11 information representing whether the operation icon belongs to open layer L1 or to closed layer L2; in other words, whether the service to be provided to a user belongs to open layer L1 or to closed layer L2. In this example, since "scheduler" icon b1 is selected, information representing open layer L2 is stored in RAM 11.

Some of the application programs executed by CPU 10 accept user input of letters and drawings. In such a case, an operation is carried out as follows. When a user selects with pen-form operating device 2 a position in work area 30A and then moves the operating device to continuously select further different positions, data corresponding to each selected position is transmitted from touch panel 3*b* to CPU 10. Each time data for selected positions is generated, CPU 10 writes within the image storage area of RAM 11 dot image data which represents positions selected in an area corresponding to work area 30A as shown in FIG. 5. As a result, a shifting trail representation of positions selected by pen-form operating device 2 is displayed in work area 30A of liquid crystal panel 3*a*. On the basis of selected position data generated via touch panel 3*b*, CPU 10 is able to determine information input by a user, such as letters, and executes data processing. A user may, in addition to letters, also input figures; and an application program executed by CPU 10 determines whether input information is in the form of letters or figures.

When a position on a group of operation icons B2 is selected, CPU 10 does not perform any processing, or causes liquid crystal drive circuit 14 to display a message such as "operation is not accepted". Accordingly, when a selected position notified by touch panel 3*b* corresponds to, for example, "internet" icon b8 (see FIG. 6), CPU 10 does not proceed to enable an Internet connection.

On the other hand, when a data layer setting flag F is "1" upon the determination of step S4, CPU 10 determines which positions in work area A2 or to which group of operation icons B2 of closed layer L2, or which group of operation icons B1 of open layer L1 the selected position notified by touch panel 3*b* corresponds, and executes processing on the basis of the determination result (step S6).

More specifically:

If the selected position, for example, is "scheduler" icon b1 (see FIG. 6) associated with open layer L1, CPU 10 performs precisely the same processing operation as in a case where data layer setting flag F is "0".

If "Internet" icon b8 (see FIG. 6) associated with closed layer L2 is selected, CPU 10 reads from flash memory 13 any additional data corresponding to "Internet" icon b8 and executes an application program designated by such additional data, which, in this case, would be a program for enabling Internet connections. At this time CPU 10 also writes in a predetermined storage area of RAM 11 information representing closed layer L2.

As has been explained, when processing in step S5 or step S6 has been completed, CPU 10 returns to step S3, and repeats the processing of steps S3, S4 and S5, or the processing of S3, S4 and S6 until power is turned off.

Thus, if a data layer setting flag F is "1", in response to an operation using pen-form operating device 2 to select an area of touch panel 3*b*, CPU 10 performs all processing corresponding to both groups of operation icons B1 and B2, whereas if a data layer setting flag F is "0", CPU 10 performs the processing corresponding only to a group of operation icons B1. In this case, the number and the types of icons among groups of operation icons B1 and B2 may be selected by a user as desired.

When determining, on the basis of a position selected, a state of "power off" icon b3 (see FIG. 6) is selected, CPU 10 refers to information stored at that time in a predetermined storage area of RAM 11. Depending on the information, CPU 10 determines whether the data operation is associated with open layer L1 or closed layer L2. If the service is associated with closed layer L2, CPU 10 automatically saves in flash memory 13 any data displayed in work area 30A of interface screen 30, and when the saving processing is complete, power is turned off. On the other hand, if the data operation is associated with closed layer L2, CPU 10 turns off power without carrying out automatic saving. In other words, data in closed layer L2 is automatically saved, while that in open layer L1 can only be saved upon the explicit instruction of a user.

As has been explained, in the present embodiment, if pen-form operating device 2 is positioned proximate to data processing system 1 thereby causing a data layer setting flag F to be "1", data operations in both open layer L1 and closed layer L2 are available to a user.

If pen-form operating device 2 which transmits identification data IDa which matches identification data ID stored in ROM 12 is not in proximity to, only data operations in open layer L1 are available. Accordingly, data processing system 1 not only restricts operations made by unauthorized users but also obviates the need for designated users to memorize and enter access authorization information such as passwords or user names, since specific operation access restriction for designated users may be disabled automatically. A further inherent advantage of the present invention will be apparent in that as long as a designated user with access to closed layer L2 and in possession of pen-form operating device 2 remains proximate to the data processing system, a third party user in possession of another pen-form operating device has access to data operations controlled by, for example, a group of operation icons B2. Further, a user in possession of data processing system 1 can hand the system to a person in possession of another pen-form operating device to enable that person to directly input an address, date or other information. If desired, a removable member such as a cap can be provided which functions to cut off transmission of identification data ID from pen-form operating device 2. A switch may also be provided on pen-form operating device 2, which when switched off would prevent any access to functions of operation icons B2.

As will be obvious from the preceding description, by using the system of the present invention, it is possible to easily and effectively restrict, on a user basis, access to operations within a restricted data layer. In other words, access to operations within a restricted data layer on the interface screen of the system is made dependent on the identification of a user via pen-form operating device 2. Thus, switching between the plurality of data layers accessible within the system can be rapidly and reliably effected on the basis of transmitted identification data of pen-form operating device 2.

(2) Modification of Embodiment

As will be apparent, the present invention is not limited to the embodiment described above, and a wide variety of modifications are included within its scope. By way of illustration, the following examples are given.

(2.1)

In the embodiment described above, an interface screen 30 consists of two data layers, open layer L1 and closed layer L2, but it is also possible to provide simultaneously multiple interface screens. For example, an interface screen 30 can be provided as a composite screen of an interface screen belonging to open layer L1 and of an interface screen belonging to closed layer L2, but a data layer to be displayed as interface screen 30 can be switched and displayed depending on received identification data IDa.

(2.2)

In the above embodiment, identification data ID which is stored in ROM 12 relates only to one user, but it is equally possible for all identification data ID transmitted by pen-form operating devices 2 to be stored in ROM12, with each pen-form operating device 2 being used by a person who is authorized to access designated operations of data processing system 1.

Figure 8:
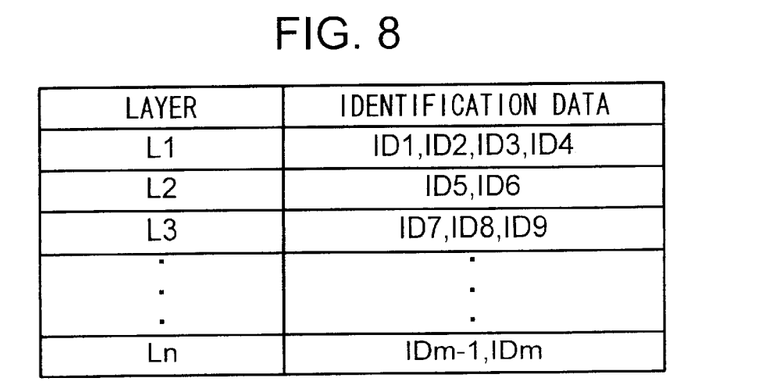
FIG. 8 is a figure illustrating a modification of the embodiment.

Also as shown in FIG. 8, data can be stored in advance in data processing system, wherein a data table representing a correspondence between layer Lk (k is 1,2, . . . n) and identification data IDi (i is 1 to m), and on the basis of such data, a layer Lk containing an interface screen available for a particular user may be switched on the basis of identification data IDa is transmitted to the system. More specifically, if identification data IDi matching any identification data ID stored in ROM 12 is received, CPU 10 sets data layer setting flag F to "1" as well as switching layer Lk to which an available interface screen belongs by referring to stored data representing a correspondence between each layer Lk and identification data IDi. On the other hand, if no identification data IDi is received, a data layer setting flag F is set to "0" and each operation icon can be made unavailable without any reference to data representing such correspondence. In this way, in the case that the system has multiple users, available operations can be readily restricted, as required, depending on an identity of a current user.

(2.3)

In the above embodiment, by employing a timer, for example, during periodical interrupt of reception determination and identification determination processing, identification determination can also be performed. A timer used for this purpose could be set to activate such an operation once every several seconds.

(2.4)

In the above embodiment, CPU 10 processes identification at established intervals. Thus, if a receive operation is performed at a time synchronous with such identification determination, less power will be expended.

(2.5)

Figure 9:
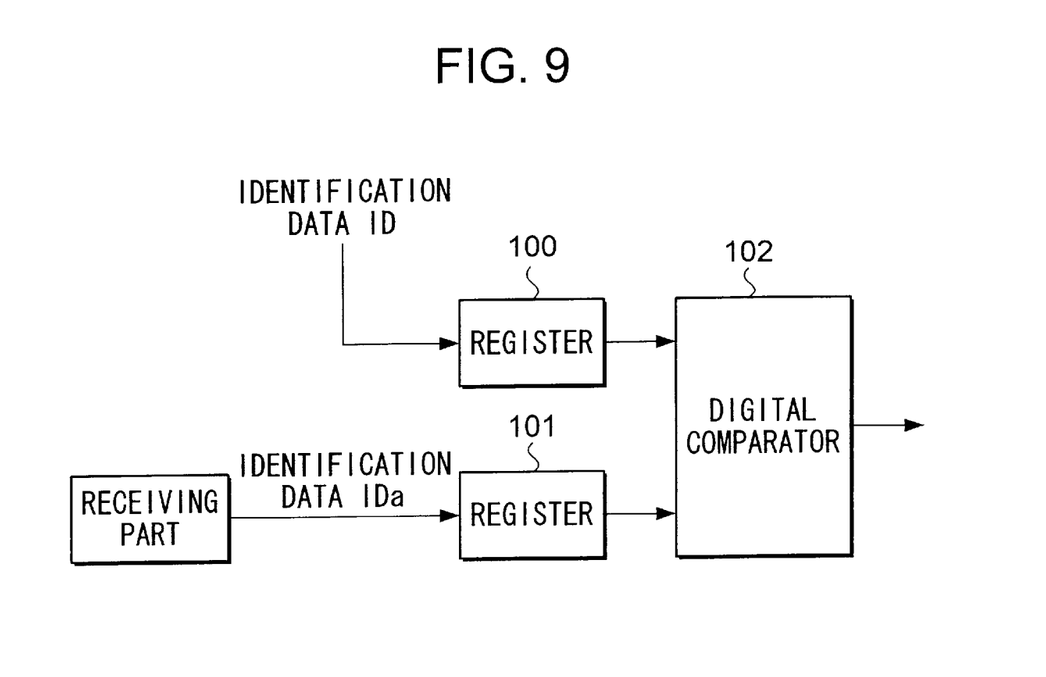
FIG. 9 is a figure illustrating another modification of the embodiment.
Figure 10:
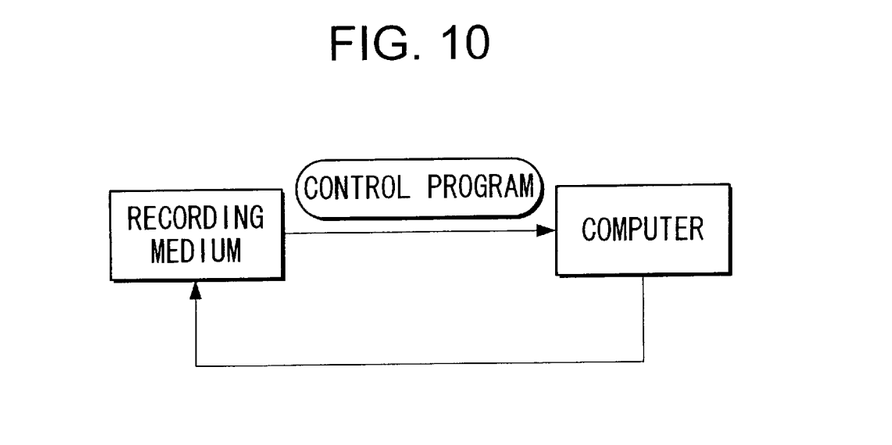
FIG. 10 is a figure illustrating a still further modification of the embodiment.

In the above embodiment, determination of identification data is performed by the CPU 10 as instructed by a program. On the contrary, as shown in FIG. 9, by providing a register 100 storing identification data, a register 101 to which received identification data IDa is transferred, and a digital comparator 102, digital comparator 102 may be made determine whether data stored in register 100 matches data transferred to register 101. Accordingly, the present invention can be implemented not only using software but also hardware.

(2.6)

In the above embodiment, a pen-form operating device 2 transmits identification data ID periodically. However, a case can be imagined where identification data ID is transmitted only when pen-form operating device 2 receives a request for transmission of identification data ID from data processing system 1. To realize this objective, a receiving part within pen-form operating device 2 may be provided, and a transmission part provided within data processing system 1. In this way, overall power consumption of pen-form operating device 2 can be lowered, thereby increasing its operating time.

(2.7)

In the above embodiment, CPU 10 periodically determines whether identification data IDa matching identification data ID which has been previously registered is received. This determination operation need only be carried out once, and a user need not memorize information for removing a restriction, nor carry out any operation to remove the restriction. As will be apparent, such features make use of the data processing system of the present invention both rapid and convenient.

(2.8)

In the above embodiment, the present invention comprises a data processing system 1 operated by a pen-form operating device 2. The point is that the present invention can be applied to any data processing system which is operable by a discrete operating device, such as a tablet or a mouse. In terms of security, it is therefore preferable for the operating device to be cordless. Also, data processing systems to which the present invention is applied are not limited to PCs, and may include any device capable of executing a program, such as a personal computer, a PDA (Personal Digital Assistants), and so on.

2.9)

Figure 4:
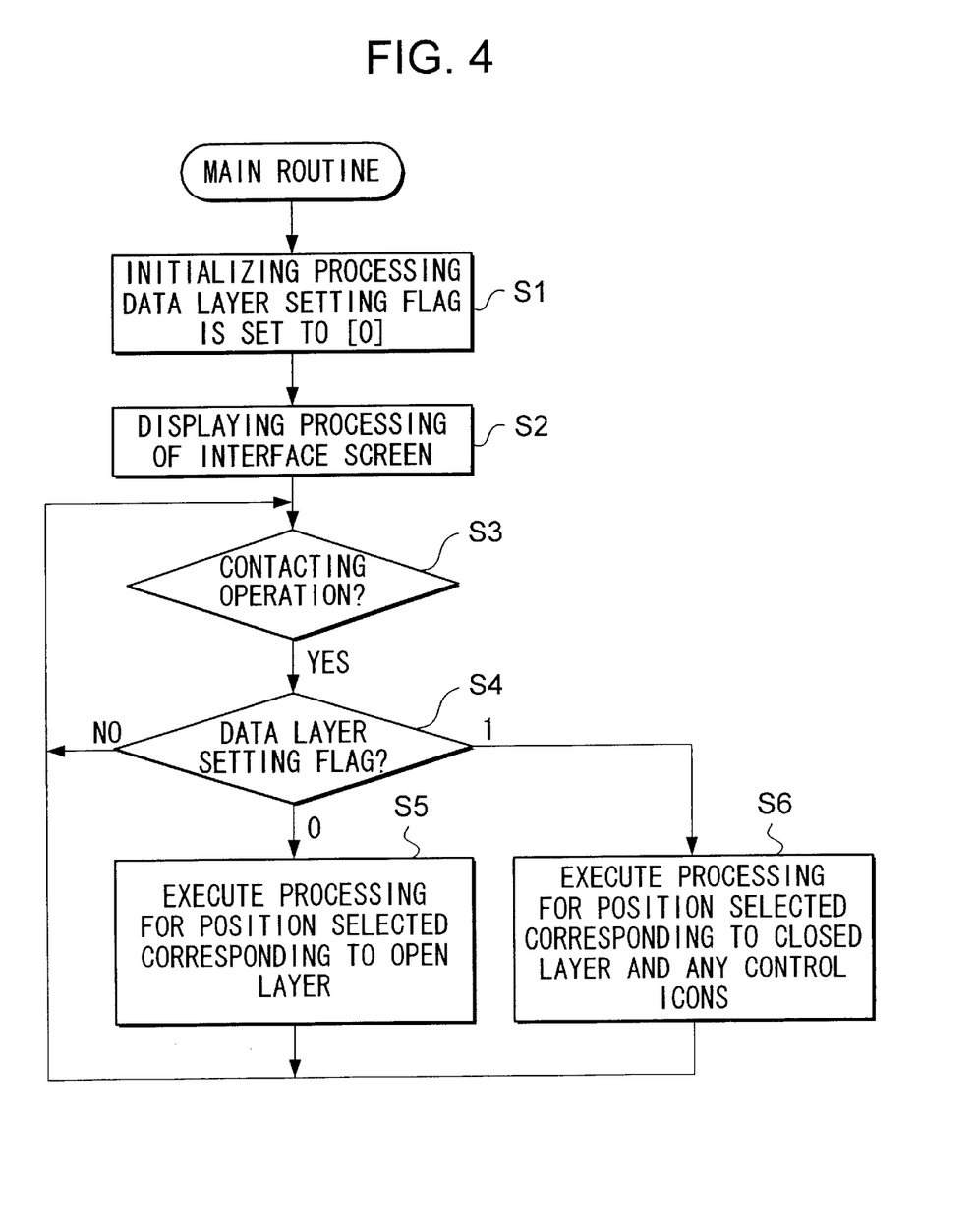
FIG. 4 is a flowchart illustrating a main routine executed in a data processing system.
Figure 11:
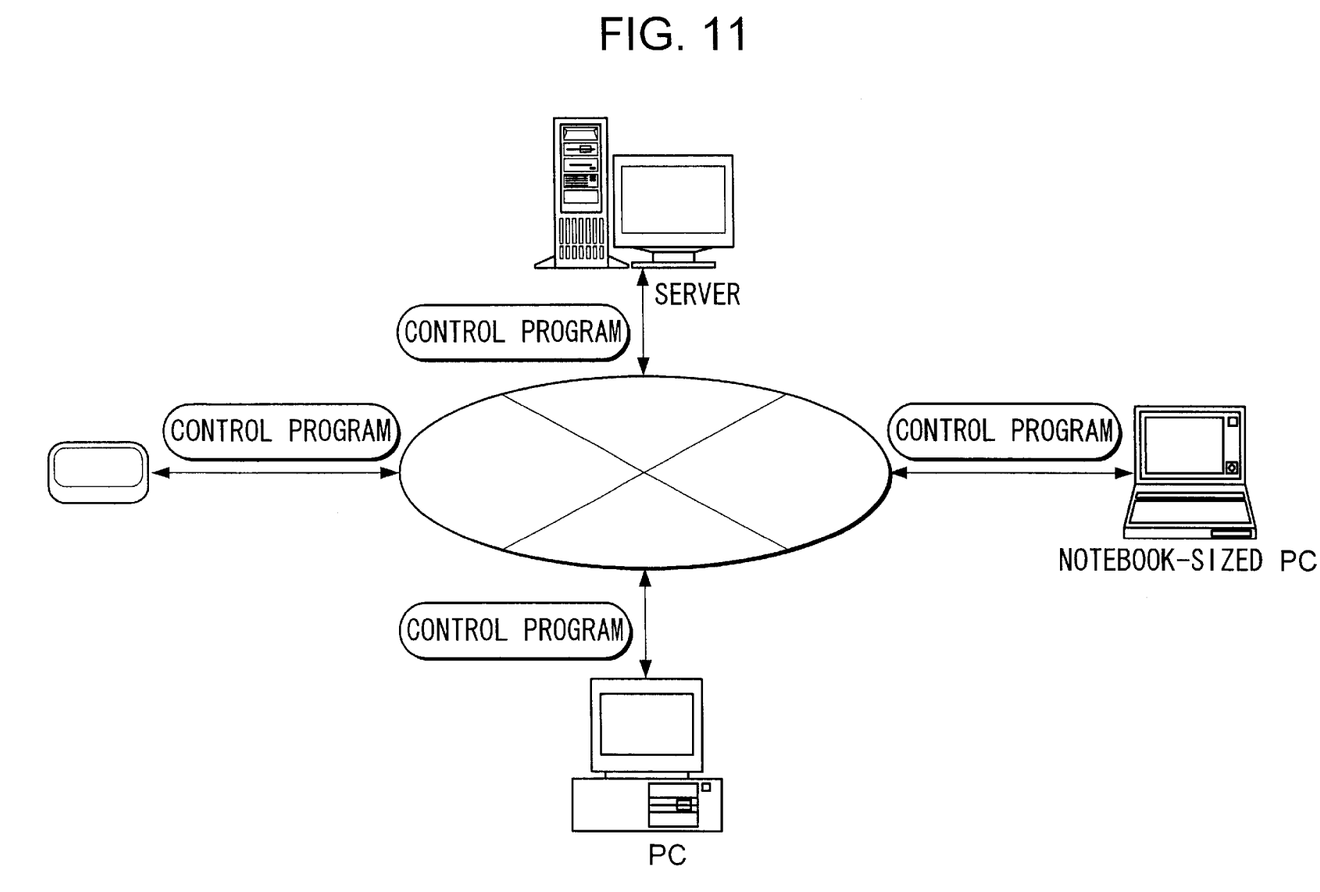
FIG. 11 is a figure illustrating yet another modification of the embodiment.

In the above embodiment, the control programs of a main routine, as shown in FIG. 4, and of data layer setting processing, as shown in FIG. 8, are memorized in data processing system 1. However, these routines may also be stored as computer executable programs in any appropriate computer-readable storage medium such as a magnetic recording medium, optical recording medium or semiconductor storage medium, for reading and executing by a computer. Further, as shown in FIG. 11, these programs may also be stored in a server for transmittance to a terminal such as PC when a transmission request is made over a network.

What is claimed is:

1. A data processor comprising:

a displaying means for displaying an interface screen on which images are generated, with each image corresponding to a data processing operation executed in one of a plurality of data layers, and selection of one of which enables a user to execute a corresponding predetermined operation;

a discrete operating device for selecting a position corresponding to a particular image on said interface screen, and for transmitting identification data;

a position detecting means for detecting a position selected by using an operating device;

a storage means for storing identification data;

a receiving means for receiving identification data;

a determining means for determining whether or not identification data stored in said storage means is received by said receiving means;

a data layer selecting means for selecting, on the basis of a determination result output from said determining means, one or more of said plurality of data layers; and a data processing means for carrying out data processing in a data layer selected by said data layer selecting means, said data layer in which said data processing operation is executed being determined by a position detected by said position detecting means.

2. A data processor as claimed in claim 1, wherein:

said discrete operating device continuously transmits identification data;

said determining means continuously determines whether said identification data stored in said storage means is received by said receiving means;

said data layer selecting means selects, on the basis of a determination result output from said determining means, one ore more of said plurality of data layers, when a position corresponding to a predetermined data processing operation is detected by said position detecting means.

3. A data processor as claimed in claim 1, wherein said displaying means displays said interface screen by generating images in which one or more operating icons are arranged, with each of said one or more operating icons corresponding to a data processing operation executed in each of said plurality of data layers.

4. A data processor as claimed in claim 1 further comprising:

a storage means for storing data of one or more data layer in which a data processing operation under said data processing means' execution belongs; and a saving means for selectively and automatically saving data of said one or more data layers stored by said storage means.

5. A control method for a data processing system, said method comprising the steps of:

displaying on a display means an interface screen on which images are generated, with each image corresponding to a data processing operation executed in one of a plurality of data layers, and selection of one of which enables a user to execute a corresponding predetermined data operation;

detecting by a position detecting means within said interface screen a position selected by using a discrete operating device;

receiving identification data in a receiving means;

determining whether identification data stored in a storage means is received by said receiving means;

selecting, on the basis of a determination result of said determining step, one or more of said plurality of data layers; and executing a data processing operation in a data layer selected in said data layer selecting step, with said data layer in which said data processing operation is executed being determined by a position detected in said position detecting step.

6. A control method for a data processing system as claimed in claim 5, wherein:

said determining step includes continuously determining whether said identification data stored in said storage means is received by said receiving means;

said data layer selecting step includes selecting one or more of said plurality of data layers on the basis of a result of said determining step, when a position corresponding to a predetermined data processing operation is detected by said position detecting means.

7. A control method for a data processing system as claimed in claim 5, wherein said displaying step includes displaying an interface screen by generating images in which one or more operating icons are arranged, with each of said one or more operating icons corresponding to a data processing operation executed in each of said plurality of data layers.

8. A control method for a data processing system as claimed in claim 5, said method further comprising:

a storing step of storing data of one or more of said plurality of data layers within which a data processing operation is being executed; and a saving step of selectively and automatically saving data of said one or more of plurality of data layers stored in said storing step.

9. A control program product for a computer for executing the processes of:

displaying on a display means an interface screen on which images are generated, each image corresponding to a data processing operation executed in one of a plurality of data layers, and selection of one of which enables a user to execute a corresponding predetermined data processing operation;

detecting by a position detecting means within said interface screen a position selected by using a discrete operating device;

receiving identification data in a receiving means;

determining whether identification data stored in a storage means is received by said receiving means;

selecting, on the basis of a determination result of said determining step, one or more of said plurality of data layers; and executing a data processing operation in a data layer selected in said data layer selecting process, with said data layer in which said data processing operation is executed being determined by a position detected in said position detecting process.

10. A control program product as claimed in claim 9, wherein:

said determining process includes continuously determining whether identification data stored in said storage means is received by said receiving means;

said data layer selecting process includes selecting one or more of said plurality of data layers on the basis of a result of said determining process, when a position corresponding to a predetermined data processing operation is detected by said position detecting means.

11. A control program product for a computer as claimed in claim 9, wherein:

said displaying process includes displaying an interface screen by generating images in which one or more operating icons are arranged, with each of said one or more operating icons corresponding to a data processing operation executed in each of a plurality of said data layers.

12. A control program product for a computer as claimed in claim 9, for executing:

a storing process of storing data of one or more of said plurality of data layer within which a data processing operation is being executed; and a saving process of selectively and automatically saving data of said one or more of plurality of data layers stored in said storing process.

13. A computer-readable recording medium that has recorded a control program for causing a computer execute the processes of:

displaying on a display means an interface screen on which images are generated, each of said images corresponding to a data processing operation executed in one of a plurality of data layers, and selection of one of which enables a execute a corresponding predetermined data processing operation;

detecting by a position detecting means within said interface screen a position selected by using an operating device;

receiving identification data in a receiving means;

determining whether identification data stored in a storage means is received by said receiving means;

selecting, on the basis of a determination result of said determining process, one or more of said plurality of data layers; and executing a data processing operation in a data layer selected in said data layer selecting process, with said data layer in which said data processing operation is executed being determined by a position detected in said position detecting process.

14. A computer-readable recording medium as claimed in claim 13, in which a control program is recorded, said control program comprising:

said determining process including continuously determining whether identification data stored in said storage means is received by said receiving means;

said data layer selecting process including selecting one or more of said plurality of data layers on the basis of a result of said determining process, when a position corresponding to a predetermined data processing operation is detected by said position detecting means.

15. A computer-readable recording medium as claimed in claim 13, in which there is recorded a control program, said control program comprising said displaying process including displaying an interface screen by generating images on which one or more operating icons are arranged, with each of said one or more operating icons corresponding to a processing operation belonging to one or other of said data layers.

16. A computer-readable recording medium as claimed in claim 13, in which a control program is recorded for a computer to further execute:

a storing process of storing data of one or more of said plurality of data layer within which a data processing operation is being executed; and a saving process of selectively and automatically saving data of said one or more of plurality of data layers stored in said storing process.

* * * * *